Figure 5:
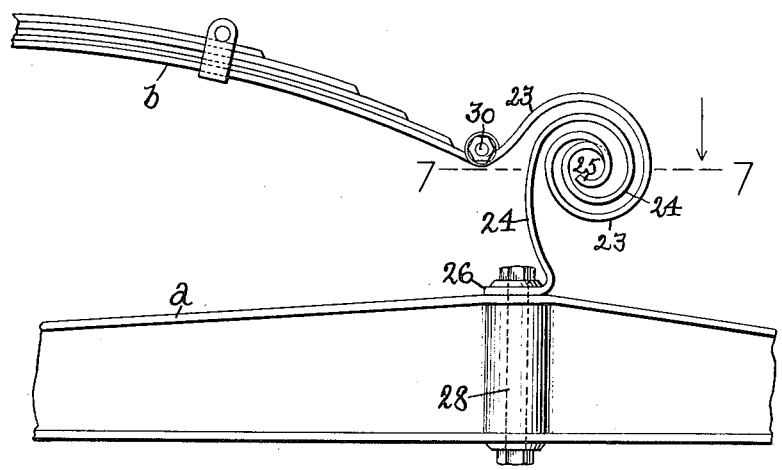

H. CARMICHAEL.
SUPPLEMENTAL SPRING FOR AUTOMOBILES.
APPLICATION FILED MAY 2, 1914.
1,125,264.
Patented Jan. 19, 1915.
2 SHEETS—SHEET 1.
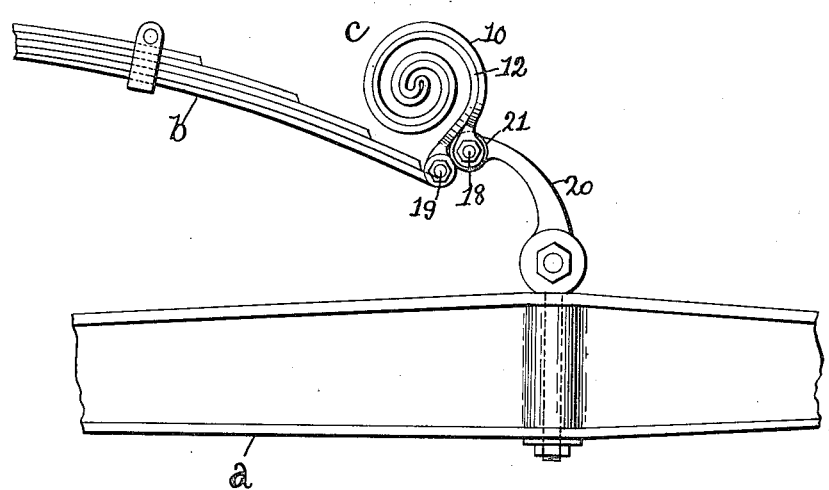
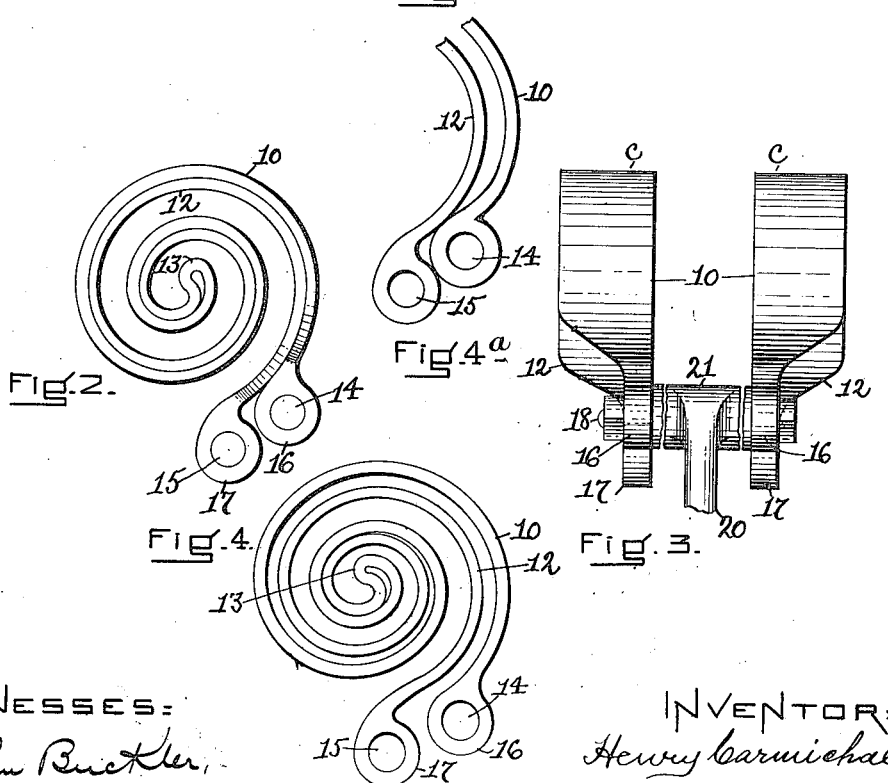
WITNESSES:
John Buckler
J. Murphy
INVENTOR:
Henry Carmichael
by Jas. H. Churchill
Atty.

H. CARMICHAEL.
SUPPLEMENTAL SPRING FOR AUTOMOBILES.
APPLICATION FILED MAY 2, 1914.

1,125,264.

Patented Jan. 19, 1915.
2 SHEETS—SHEET 2.

UNITED STATES PATENT OFFICE.

HENRY CARMICHAEL, OF MALDEN, MASSACHUSETTS, ASSIGNOR OF ONE-HALF TO ARTHUR F. GLASIER, OF BOSTON, MASSACHUSETTS.

SUPPLEMENTAL SPRING FOR AUTOMOBILES.

1,125,264.  Specification of Letters Patent.  Patented Jan. 19, 1915.

Application filed May 2, 1914. Serial No. 835,989.

*To all whom it may concern:*

Be it known that I, HENRY CARMICHAEL, a citizen of the United States, residing in Malden, in the county of Middlesex and State of Massachusetts, have invented an Improvement in Supplemental Springs for Automobiles and the like, of which the following description, in connection with the accompanying drawings, is a specification, like characters on the drawings representing like parts.

This invention relates to a supplemental spring, which is especially adapted among other uses to be employed on automobiles and like vehicles, as auxiliary to the main leaf spring.

The invention has for its object to provide a superior spring for the purpose specified, and to this end, the spring is provided with a plurality of scroll members, which are connected at their inner ends, and are provided at their outer or free ends with means for attachment to the parts to be connected, so that said members move in opposite directions, that is, when one scroll member is being coiled up or compressed, the other is uncoiled or expanded.

The scroll members may be arranged in the same or different planes as will be described.

These and other features of this invention will be pointed out in the claims at the end of this specification.

Figure 1 represents a portion of an automobile provided with a supplemental spring embodying this invention. Fig. 2, a side elevation of the supplemental spring shown in Fig. 1. Fig. 3, a front elevation of the spring shown in Fig. 1. Fig. 4, a side elevation with the spring expanded. Fig. 4$^a$, an enlarged detail to be referred to, and Figs. 5, 6 and 7, views illustrating a modified form of supplemental spring embodying the invention.

Referring to the drawing, $a$ represents an axle of an automobile of known construction, and $b$ a main or leaf spring, which is attached to the chassis of the vehicle and is connected with the axle $a$ by a supplemental spring $c$ embodying this invention.

Figure 6:
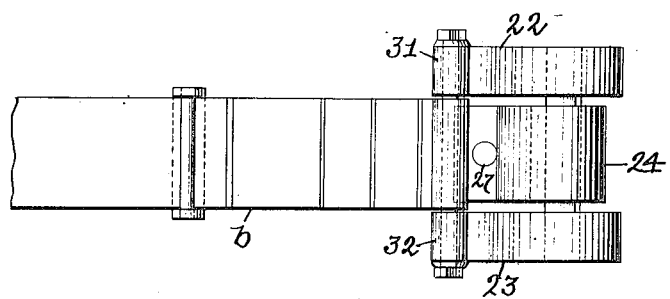
Figure 7:
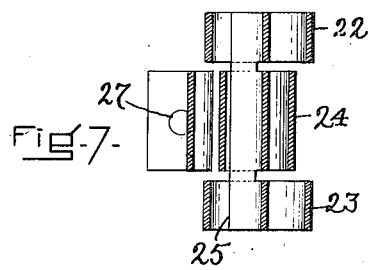

In Figs. 1 to 4$^a$, I have illustrated one construction of supplemental spring and in Figs. 5 to 7 another construction of supplemental spring, both of which embody the invention.

The supplemental spring $c$ is composed of a plurality of scroll members, shown in Figs. 1 to 4$^a$ as two members 10, 12, which are connected together at their inner ends, as at 13, and have their outer or free ends provided as herein shown with eyes 14, 15.

In the construction shown in Figs. 1 to 4$^a$, the scroll members 10, 12 are made from a substantially wide flat metal strip, which is folded substantially at its center to form two strips or members, which are bent or coiled into the form of a scroll to form the members 10, 12, which are provided at their free ends with means for attachment to the main spring $b$ and to the axle $a$.

In the present instance, the free ends of the scroll members are provided with extensions 16, 17, which may and preferably will be formed by swaging the ends of the strips and providing the same with the holes or eyes 14, 15 for the passage of bolts 18, 19, by which the supplemental spring is connected to the axle $a$ and main spring $b$.

In Fig. 1, the axle $a$ has secured to it a hanger or arm 20, which is provided at its outer end with a hollow hub 21, see Fig. 3, which is interposed between the members 10 of two supplemental springs and is connected therewith by the bolt 18, and the leaf spring $b$ has its end interposed between the members 12 of the supplemental springs and connected with the projecting ends 17 of the same by the bolt 19. It will thus be seen, that movement of the axle $a$ with relation to the main spring $b$ effects an expanding and contracting movement of one scroll member as 10, and movement of the main spring toward and from the axle effects a contracting and expanding movement of the other scroll member 12, and in the running of the automobile or other vehicle, these movements frequently take place simultaneously. It will be observed, however, that the movement of one member as 10 is in the opposite direction to the movement of the other member 12, that is, when the member 10 is expanded the member 12 is contracted and vice versa. This is illustrated in Fig. 4, which shows the scroll members separated at their free ends, and by comparing Fig. 4 with Figs. 1 and 2, it will be seen that the member 10 is expanded and the member 12 contracted, and when the members are relieved from the force or strain which places them in the condition illustrated by Fig. 4, they resume the relation and position shown in Figs. 1 and 2, and on this return movement the member 10 contracts and the member 12 expands. In this manner, the supplemental spring acts to materially assist in making the automobile ride easier and also acts as a shock absorber.

In Figs. 1 to 4ᵃ, the scroll members 10, 12 are arranged in parallel planes which are coincident, but it is not desired to limit the invention in this respect, as they may be in parallel planes which are not coincident, as represented in Figs. 5 to 7, wherein two parallel scroll members 22, 23 are shown as located on opposite sides of an intermediate scroll member 24 and connected to the latter at their inner ends. In the construction shown in Figs. 5 to 7, the three scroll members are represented as made from one piece of flat metal, which is bent into the form of a scroll and then cut so as to form the three scroll members 22, 23, 24, and leave a connecting web or piece 25 at their inner ends, as clearly represented in Fig. 7. In this manner the intermediate scroll member 24 coöperates with the two outside scroll members 22, 23 and is capable of being used as a hanger, as it can be provided at its outer end with a bent portion or flange 26 having a hole 27 for the passage of a bolt 28 by which the scroll member 24 may be fastened to the axle $a$, while the two outside scroll members 22, 23 straddle the leaf spring $b$ and are connected thereto by the bolt 30, which passes through eyes or hubs 31, 32 formed in the free ends of the scroll members 22, 23. By reference to Fig. 6, it will be seen that the single supplemental spring therein shown, serves the purpose of the two supplemental springs shown in Fig. 3. The supplemental spring shown in Figs. 5 to 7 acts in the same manner as the supplemental spring shown in Figs. 1 to 4, in that, the intermediate scroll member 24 moves in the opposite direction to that in which the outside scroll members 22, 23 move, that is, when the outside scroll members contract, the intermediate scroll member expands and vice versa.

By making the supplemental spring of a plurality of scroll members, a supplemental spring of maximum stiffness and strength can be made to occupy a minimum space, thereby enabling these springs to be used on automobiles and like vehicles in places where there is little available space or room. In other words, the scroll members of the spring enables the point of application of the force applied to the spring to be brought nearer the center of the coil, and thereby shorten the leverage and reduce the danger of breaking the springs, when subjected to severe usage.

Under ordinary conditions a supplementary spring is made lighter and more readily moved than the main spring or springs, and there is observed a tendency of the accessory spring after passing over a bump, to throw the body of the car upward to an excessive degree. This tendency can be readily overcome by giving the accessory spring in its manufacture, an opposed compressive tension between the eyes equal to the proportionate weight of the car which each accessory spring must sustain. With the present scroll spring, this can readily be accomplished by separating the free ends of the scroll members 10, 12, so as to place the outer scroll member under a tension, and then while under tension, applying heat to the scroll member 10 near its eye 14, so as not to disturb the temper of the remainder of the spring, and while the spring is thus substantially locally heated, bending the free end of the outer scroll member toward and substantially into contact with the free end of the inner scroll member, and then removing the wedging means. As a result the two scroll members at their ends are placed under an initial tension as represented in Fig. 4ᵃ. In use therefore, the scroll springs do not open up under the weight of the body of the car, but do open up as soon as the car strikes an elevated object upon the road bed. As soon as the compressive movement ends, the spring returns only to its starting point and thus the upward rebound is avoided.

I have herein described the spring as especially applicable for use on automobiles and like vehicles as supplementary to the main spring, but it is not desired to limit the invention in this respect, as in the lighter class of vehicles such as motor cycles, it may be used as a main spring.

Claims:

1. A supplemental spring comprising a plurality of scroll members connected together at their inner ends, and having their outer ends free and provided with means for attachment of said members to the parts to be connected.

2. A supplemental spring comprising a plurality of scroll members in parallel planes, and having their inner ends connected together and their outer ends free and provided with means for attachment to the parts to be connected.

3. A supplemental spring comprising a plurality of scroll members in parallel coincident planes, and having their inner ends connected together and their outer ends free and provided with eyes.

4. A supplemental spring comprising a plurality of scroll members in parallel planes, and having their inner ends connected together and their outer ends free and provided with eyes.

5. A supplemental spring comprising a plurality of outside scroll members and an intermediate scroll member which has its inner end connected with the inner ends of said outside members, said inner and outside members having at their free ends means for attachment to the parts to be connected.

6. A supplemental spring comprising a plurality of scroll members in parallel coincident planes, and having their inner ends connected together and their outer ends flattened to form projections and provided with holes in the said projections.

7. A supplemental spring comprising a plurality of scroll members connected together at their inner ends and having their outer ends free and provided with means for attachment of said members to the parts to be connected, the said scroll members being placed under an initial tension.

In testimony whereof, I have signed my name to this specification in the presence of two subscribing witnesses.

HENRY CARMICHAEL.

Witnesses:
JAS. H. CHURCHILL,
J. MURPHY.